(12) United States Patent
Morishima

(10) Patent No.: US 11,767,117 B2
(45) Date of Patent: Sep. 26, 2023

(54) ROOM FOR AIRCRAFT CABIN

(71) Applicant: TOYOTA BOSHOKU KABUSHIKI KAISHA, Aichi-ken (JP)

(72) Inventor: Enoch Morishima, Sunnyvale, CA (US)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 165 days.

(21) Appl. No.: 17/142,918

(22) Filed: Jan. 6, 2021

(65) Prior Publication Data
US 2022/0212798 A1 Jul. 7, 2022

(51) Int. Cl.
*B64D 11/00* (2006.01)
*B64D 11/06* (2006.01)

(52) U.S. Cl.
CPC .......... *B64D 11/003* (2013.01); *B64D 11/06* (2013.01); *B64D 2011/0046* (2013.01)

(58) Field of Classification Search
CPC ........... B64D 11/003; B64D 11/06; B64D 2011/0046; B64D 2011/0084; B64D 11/0605; B64D 11/0604; B64D 11/0601; B64D 11/0606
See application file for complete search history.

(56) References Cited

U.S. PATENT DOCUMENTS

| | | | | |
|---|---|---|---|---|
| 2,914,001 A | * | 11/1959 | Murphy | B61D 1/04 105/315 |
| 4,066,227 A | * | 1/1978 | Buchsel | B64D 11/00 105/340 |
| 4,881,702 A | * | 11/1989 | Slettebak | B64D 11/0693 244/118.6 |
| 5,115,999 A | * | 5/1992 | Buchsel | B64C 1/00 244/119 |
| 5,716,026 A | * | 2/1998 | Pascasio | B64D 11/00 244/118.6 |
| 5,784,836 A | * | 7/1998 | Ehrick | B64D 11/00 52/79.8 |
| 5,876,059 A | * | 3/1999 | Kleinberg | B60R 21/16 280/730.1 |
| 6,056,239 A | * | 5/2000 | Cantu | B64D 11/06 244/118.6 |
| 6,073,883 A | * | 6/2000 | Ohlmann | B64D 11/00 244/118.6 |
| 6,464,169 B1 | * | 10/2002 | Johnson | B64D 11/0007 244/118.6 |

(Continued)

FOREIGN PATENT DOCUMENTS

| | | |
|---|---|---|
| JP | 2012-518574 A | 8/2012 |
| JP | 2015-518574 A | 8/2012 |

*Primary Examiner* — Medhat Badawi
(74) *Attorney, Agent, or Firm* — GREENBLUM & BERNSTEIN, P.L.C.

(57) ABSTRACT

A room for an aircraft cabin is a hollow box shaped room and installed in the aircraft cabin. The room includes a floor wall portion that is configured to face a seat of the cabin, a side wall portion that extends from the floor wall portion in a direction away from the seat and has an opening portion for entering and leaving the room, a ladder portion extending in a direction toward the seat from a periphery of the opening portion, and a ceiling wall portion that extends to couple the floor wall portion and the side wall portion and has an engagement structure with an inner wall of the cabin.

4 Claims, 4 Drawing Sheets

(56) References Cited

U.S. PATENT DOCUMENTS

| | | | | |
|---|---|---|---|---|
| 6,520,451 | B1* | 2/2003 | Moore | B64D 11/00 244/119 |
| 6,581,876 | B2* | 6/2003 | Cheung | B64D 11/0604 244/118.5 |
| 6,616,098 | B2* | 9/2003 | Mills | B64D 11/00 244/129.6 |
| 6,659,225 | B2* | 12/2003 | Olliges | B64D 11/00 244/118.5 |
| 6,932,298 | B1* | 8/2005 | Mills | B64D 11/0604 244/118.6 |
| 7,077,360 | B2* | 7/2006 | Jacob | B64D 11/00 244/118.5 |
| 7,237,749 | B2* | 7/2007 | Ritts | B64D 11/00 244/159.5 |
| 7,275,716 | B2* | 10/2007 | Saint-Jalmes | B64D 11/0641 244/118.6 |
| 7,354,018 | B2* | 4/2008 | Saint-Jalmes | B64D 11/00 244/118.6 |
| 7,389,959 | B2* | 6/2008 | Mills | B64D 11/00 244/118.6 |
| 7,762,496 | B2* | 7/2010 | Seiersen | B64D 11/00 244/118.6 |
| 8,219,022 | B2* | 7/2012 | Zebic | H04L 12/282 370/254 |
| 8,746,617 | B2* | 6/2014 | Beal | B64D 11/06 244/118.6 |
| 8,794,569 | B1* | 8/2014 | Ohlmann | B64D 11/00 244/118.6 |
| 8,991,756 | B2* | 3/2015 | Papke | B64D 11/00 244/118.6 |
| 9,308,995 | B2* | 4/2016 | Spellman | B64D 11/00 |
| 9,340,294 | B1* | 5/2016 | Keleher | B64C 1/1407 |
| 9,682,779 | B2* | 6/2017 | Hasegawa | B64D 11/0604 |
| 9,708,065 | B2* | 7/2017 | Sankrithi | B64C 1/00 |
| 10,314,285 | B1* | 6/2019 | Ursescu | A01K 1/0272 |
| 10,625,861 | B2* | 4/2020 | Benthien | B64D 11/003 |
| 10,793,247 | B2* | 10/2020 | Fan | H05K 7/20709 |
| 10,807,716 | B2* | 10/2020 | Young | B64F 5/10 |
| 10,824,889 | B2* | 11/2020 | Behr | H04N 23/57 |
| 10,850,845 | B2* | 12/2020 | Young | B64D 11/003 |
| 10,909,397 | B2* | 2/2021 | Behr | H04N 23/63 |
| 11,136,124 | B2* | 10/2021 | Benthien | B64D 11/003 |
| 11,136,137 | B2* | 10/2021 | Escobar | H04N 7/181 |
| 11,167,850 | B2* | 11/2021 | McKee | B64D 11/00 |
| 11,168,487 | B2* | 11/2021 | Wankewycz | H02J 7/0042 |
| 11,235,852 | B2* | 2/2022 | Behr | B64C 1/1423 |
| 11,312,494 | B2* | 4/2022 | O'Neill | B60N 2/753 |
| 11,414,192 | B2* | 8/2022 | Mayer | B64D 11/00 |
| 11,447,250 | B2* | 9/2022 | Behr | B64D 11/00 |
| 2007/0102577 | A1* | 5/2007 | Saint-Jalmes | B64D 11/00 244/118.6 |
| 2009/0302156 | A1* | 12/2009 | Saint-Jalmes | A61G 3/001 244/118.6 |
| 2010/0301163 | A1* | 12/2010 | Guering | B64D 11/00 244/118.6 |
| 2011/0253005 | A1* | 10/2011 | Sun | B61D 31/00 105/315 |
| 2012/0187244 | A1* | 7/2012 | Beal | B64D 11/06 244/118.6 |
| 2014/0298582 | A1* | 10/2014 | Kircher | B60P 3/38 5/9.1 |
| 2015/0266581 | A1* | 9/2015 | Roese | B64D 11/00 244/118.6 |
| 2017/0057637 | A1* | 3/2017 | Cole | B64D 11/00 |
| 2018/0009549 | A1* | 1/2018 | Sullivan | B64C 39/022 |
| 2018/0056846 | A1* | 3/2018 | Nasiri | B60N 3/001 |
| 2018/0265201 | A1* | 9/2018 | Carlioz | B64D 11/0007 |
| 2021/0269157 | A1* | 9/2021 | Schmidt-Schäffer | B64D 11/0606 |
| 2022/0212798 | A1* | 7/2022 | Morishima | B64D 11/0605 |
| 2022/0371737 | A1* | 11/2022 | O'Neill | B64D 11/0604 |

\* cited by examiner

ROOM FOR AIRCRAFT CABIN

TECHNICAL FIELD

The present invention relates to a hollow box shaped room installed in an aircraft cabin.

BACKGROUND ART

In the related art, JP-T-2012-518574 (hereinafter, refers to as "PTL1") discloses a berth unit installed in an aircraft cabin so that a passenger of the aircraft can lie down and sleep.

In the related art, the berth unit disclosed in PTL 1 is installed in the aircraft cabin in a manner in which the berth unit is adjacent to a side surface of a seat (for example, the berth unit is interposed between a body wall of the aircraft and a seat). Generally, a size of a space that can be ensured as a cabin is limited due to the design of the aircraft. Therefore, in order to install the berth unit in the cabin, the number of seats may be reduced by the number of installed berth units in practice.

SUMMARY OF INVENTION

From the viewpoint of increasing the number of passengers capable of boarding an aircraft as much as possible, it is not desirable to reduce the number of seats.

Aspect of non-limiting embodiments of the present disclosure relates to a room for an aircraft cabin that can be installed in an aircraft cabin without reducing the number of seats in the aircraft cabin.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

(1) According to an aspect of the present disclosure, there is provided a room for an aircraft cabin which is a hollow box shape and installed in the aircraft cabin. The room includes:
a floor wall portion that is configured to face a seat of the cabin;
a side wall portion that extends from the floor wall portion in a direction away from the seat and has an opening portion for entering and leaving the room;
a ladder portion extending in a direction toward the seat from a periphery of the opening portion; and
a ceiling wall portion that extends to couple the floor wall portion and the side wall portion and has an engagement structure with an inner wall of the cabin.

The room having the configuration has a box shaped inner space defined by the floor wall portion facing seats of the cabin, the side wall portion that extends from the floor wall portion in a direction away from the seats and has an opening portion for entering or leaving the room, and the ceiling wall portion that extends to couple the floor wall portion and the side wall portion. The ceiling wall portion of the room includes the engagement structure with the inner wall of the cabin. A specific shape or the like of the engagement structure is not particularly limited. Accordingly, different from the berth unit disclosed in PTL 1, the room can be installed above the seats, and it is not necessary to reduce the number of seats when installing the room. When the room is installed above the seats, a passenger can enter and leave the room by using the ladder portion extending in a direction toward the seats from a periphery of the opening portion which is entrance and exit, and an original function of a berth on which a passenger can lie down and sleep is not impaired.

In the above room for the aircraft cabin, the side wall portion includes a luggage storage room that is openable and closable from an outer side of the room.

The room having the configuration is provided with the luggage storage room at the side wall portion of the room. Accordingly, the room also has a function of a luggage rack that is generally provided above seats.

In the above room for the aircraft cabin, the side wall portion includes a recessed portion that is recessed from an inner side to an outer side of the room and expands an inner space of the room.

Since the room is provided with the recessed portion recessed from the inner side to the outer side of the room at the side wall portion, an inner space of the room is expanded. Accordingly, for example, a passenger can use the room in a state in which an upper body of the passenger (particularly, a periphery of shoulders of a large width in a body structure) is located in the recessed portion. Therefore, comfort of the room is improved.

In the above room for the aircraft cabin, the ladder portion includes a coupling portion for coupling to the seat.

Since the ladder portion extending in a direction from the room to the seats is coupled to the seat via a coupling portion, the room can be supported by being coupled to the seats via the coupling portion, and can be supported by being engaged with the inner wall of the cabin via the engagement structure. A specific shape or the like of the coupling portion is not particularly limited. Therefore, the room can be firmly fixed in the cabin.

BRIEF DESCRIPTION OF DRAWINGS

Exemplary embodiment(s) of the present invention will be described in detail based on the following figures, wherein.

DESCRIPTION OF EMBODIMENTS

Figure 1:
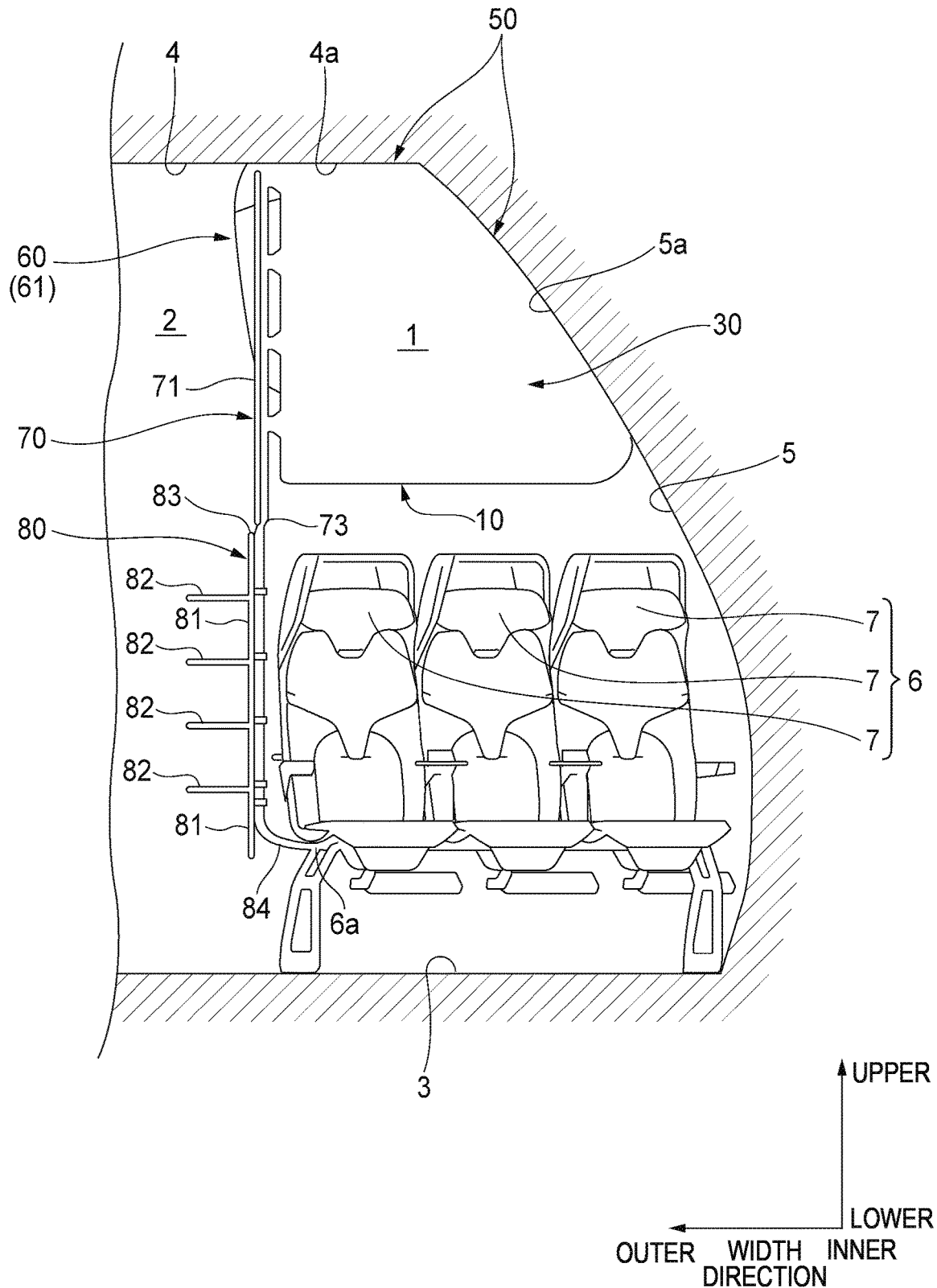
FIG. 1 is a cabin cross-sectional view viewed from a front side and showing a part of an aircraft cabin in which a room according to an embodiment of the present invention is installed.
Figure 2:
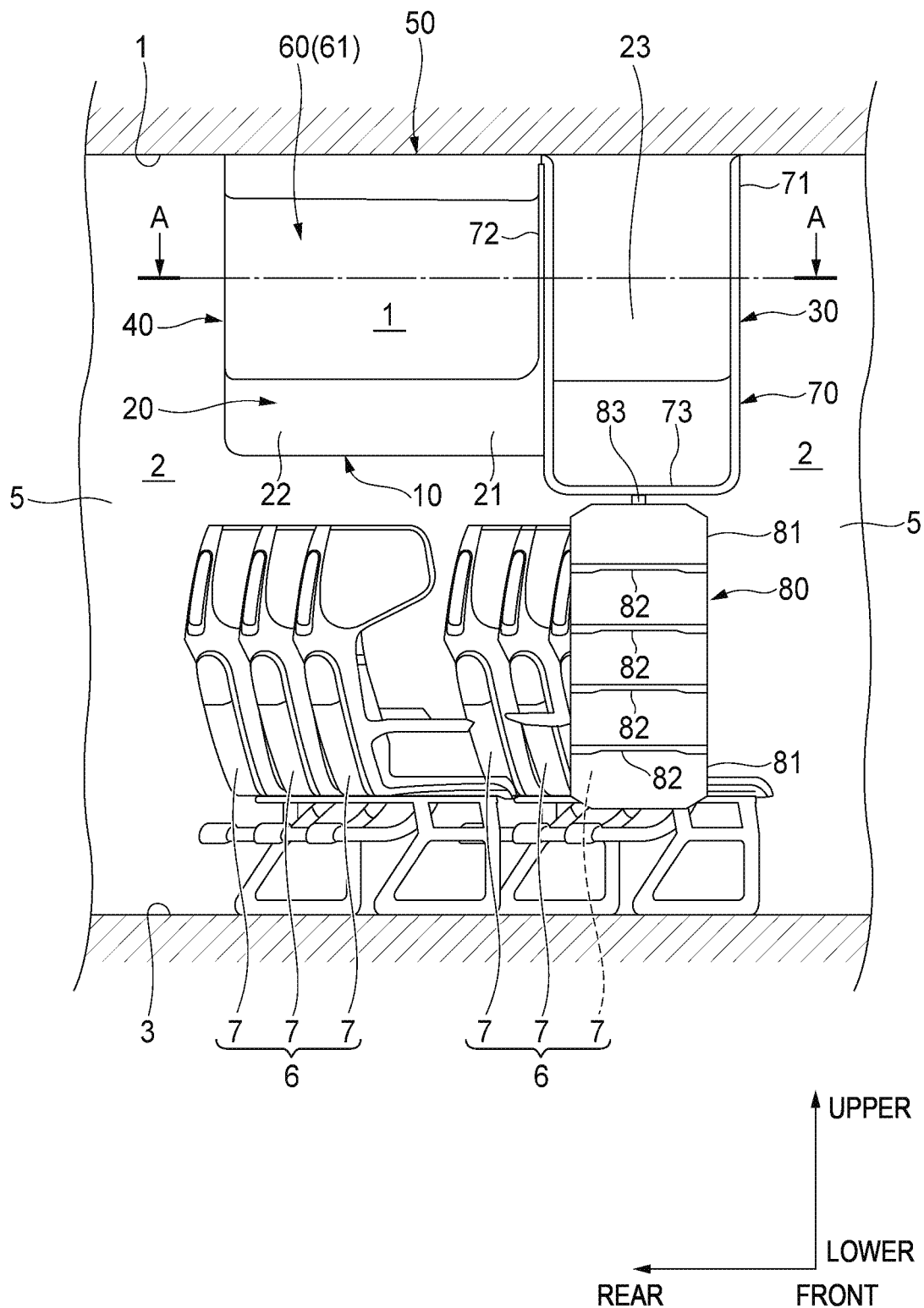
FIG. 2 is a cabin cross-sectional view viewed from a side and showing a part of the aircraft cabin in which the room according to the embodiment of the present invention is installed.
Figure 3:
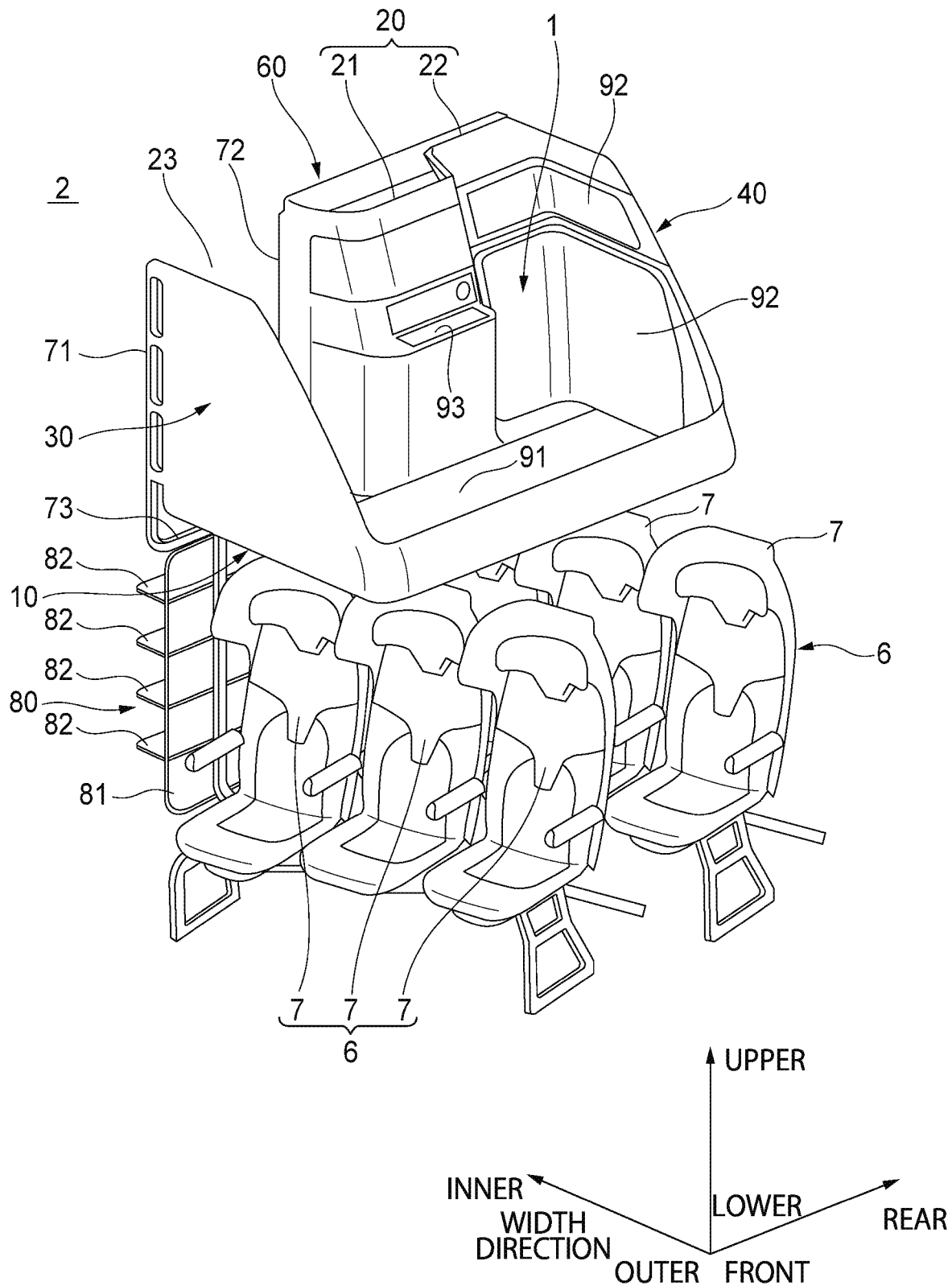
FIG. 3 is a perspective view viewed from the front side and showing a part of the aircraft cabin in which the room according to the embodiment of the present invention is installed, and is a view in which walls defining the cabin and a ceiling wall portion of the room are omitted.

Hereinafter, a room 1 according to an embodiment of the present invention will be described with reference to the drawings. As shown in FIGS. 1 to 3, the room 1 has a capsule shape of a hollow box shape and is installed above a seat unit 6 (that is, one or more seats 7) in an aircraft cabin 2. The room 1 can be mainly used as a bedroom or a lounge for a passenger. In FIG. 3, walls defining the cabin 2 and a part of walls defining the room 1 (a part of a ceiling wall portion 50 to be described later) are omitted for the convenience of description. The room 1 can be installed in the aircraft cabin 2 without reducing the number of seats in the cabin 2.

Hereinafter, as shown in FIGS. 1 to 4, a "front-rear direction", an "upper-lower direction", a "width direction", "front", "rear", "upper", "lower", "outer", and "inner" are defined for convenience of description. The front-rear direction, the upper-lower direction, and the width direction are orthogonal to one another. The front-rear direction, the upper-lower direction, and the width direction respectively coincide with the front-rear direction, the upper-lower direction, and the width direction of the aircraft (that is, the cabin 2). A width direction inner side corresponds to a passage side of the cabin 2, and a width direction outer side corresponds to a window side of the cabin 2.

In an example shown in FIGS. 1 to 4, a cabin of an economy class serves as the cabin 2 in which a plurality of seat units 6 that integrally includes three seats 7 lined up side by side are provided at two sides sandwiching a passage that extends in the front-rear direction and located at a width direction central portion of the cabin 2. The plurality of seat units 6 are spaced at an interval in the front-rear direction. As shown in FIG. 1, the cabin 2 is a cylindrical space that is defined by a bottom wall 3, a ceiling wall 4, and a pair of side walls 5 and extends in the front-rear direction. In this example, as shown in FIGS. 2 and 3, each of the seat units 6 is provided on the bottom wall 3 in a manner of slightly inclined with respect to the width direction so that the seat 7 at a width direction inner side (passage side) is located in front of the seat 7 at a width direction outer side (window side).

As can be understood from FIGS. 2 and 3, a plurality of rooms 1 are installed at an interval in the front-rear direction and are installed above the plurality of seat units 6 at two sides sandwiching the passage in a manner in which one room 1 corresponds to two seat units 6 (that is, six seats 7 in total) that are adjacent in the front-rear direction. Hereinafter, a configuration of the room 1 will be described.

As shown in FIGS. 1 to 4, the room 1 has a hollow box shape extending the front-rear direction, and is defined by a floor wall portion 10, a side wall portion 20, a front wall portion 30, a rear wall portion 40, and the ceiling wall portion 50. As can be understood from FIGS. 1 to 4 (particularly FIG. 4 which is a cross-sectional view taken along a line A-A in FIG. 2), the floor wall portion 10 is a substantially rectangular flat plate shaped wall that is long in the front-rear direction and extends in the front-rear direction and the width direction. The floor wall portion 10 has a shape having a protruding portion 11 that protrudes to the width direction inner side in a front side area. A protruding end edge 12 of the protruding portion 11 extending in the front-rear direction constitutes a lower end edge of an opening portion 23 (see FIGS. 2 to 4) to be described later.

Figure 4:
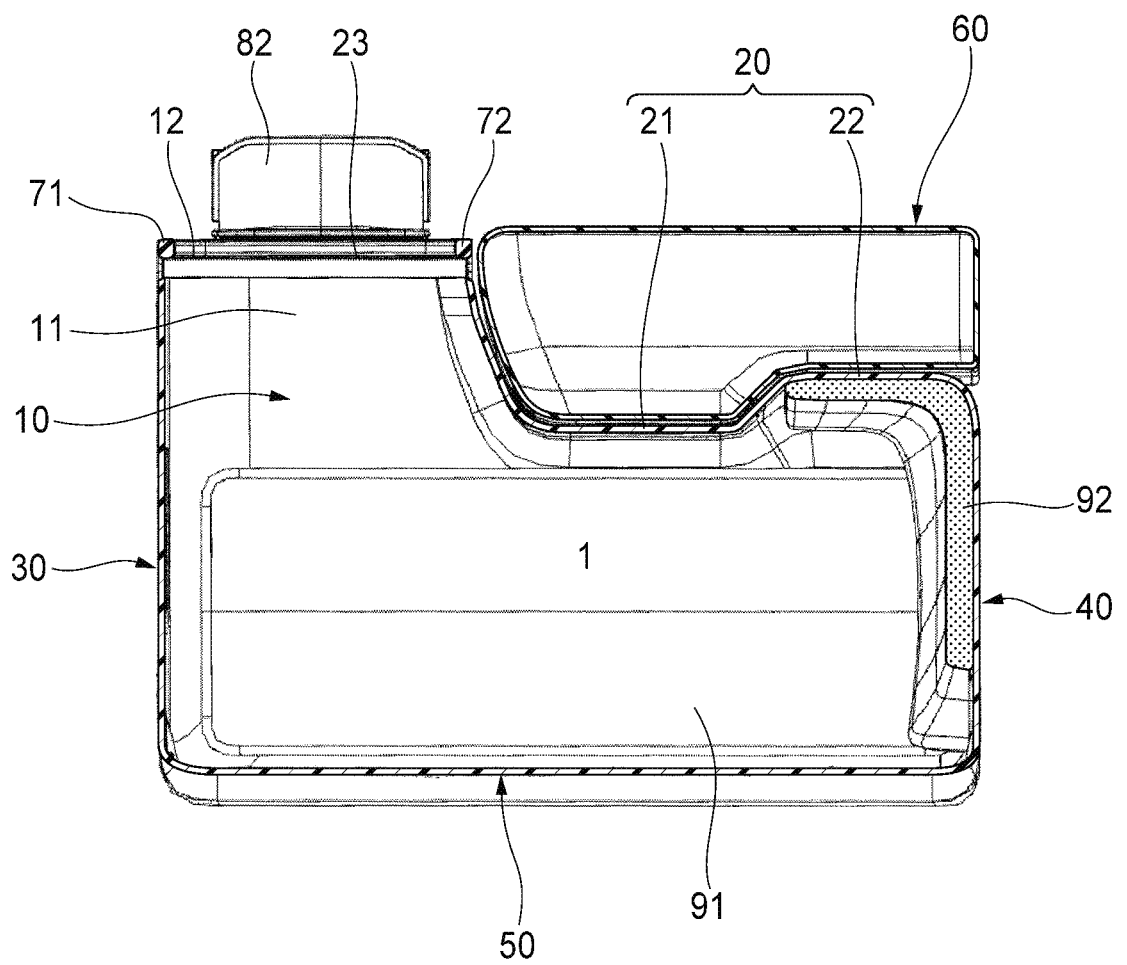
FIG. 4 is a cross-sectional view taken along a line A-A in FIG. 2 and in which seats are omitted.
Figure 4:
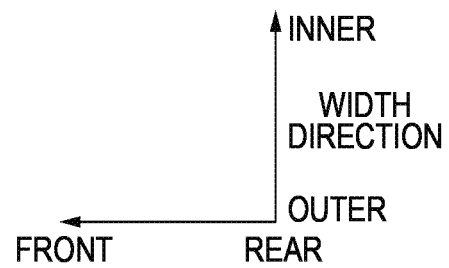

The side wall portion 20 is a wall that rises upward integrally from a width direction inner side edge of the floor wall portion 10 excluding the protruding end edge 12 of the protruding portion 11. As shown in FIGS. 3 and 4, the side wall portion 20 includes a protruding portion 21 and a recessed portion 22. The protruding portion 21 is continuous with a rear end of the protruding end edge 12 and protrudes to the width direction inner side (protrudes from an outer side to an inner side of the room 1). The recessed portion 22 is continuous with a rear side of the protruding portion 21 and is recessed to the width direction outer side (recessed from the inner side to the outer side of the room 1). Since the recessed portion 22 is formed, an inner space of a rear end portion of the room 1 is expanded compared with a case in which the recessed portion 22 is not formed (a case in which a top portion of the protruding portion 21 extending in the front-rear direction is continuous up to a rear end of a width direction inner side edge of the floor wall portion 10).

As shown in FIGS. 1 and 3, the front wall portion 30 is a flat plate shaped wall that rises upward integrally from a front end edge of the floor wall portion 10 that extends in the width direction. A width direction inner side edge of the front wall portion 30 extends linearly in the upper-lower direction. An upper end edge of the front wall portion 30 extends in the width direction corresponding to an end portion 4a (see FIG. 1) at a width direction outer side of the ceiling wall 4 of the cabin 2. A width direction outer side edge of the front wall portion 30 extends in a manner in which the width direction outer side edge is inclined with respect to the upper-lower direction corresponding to an end portion 5a (see FIG. 1) at an upper side of the side wall 5 of the cabin 2.

As shown in FIG. 3, the rear wall portion 40 is a flat plate shaped wall that rises upward integrally from a rear end edge of the floor wall portion 10 that extends in the width direction. A width direction inner side edge of the rear wall portion 40 extends linearly in the upper-lower direction. An upper end edge of the rear wall portion 40 extends in the width direction corresponding to the end portion 4a (see FIG. 1) of the ceiling wall 4 of the cabin 2. A width direction outer side edge of the rear wall portion 40 extends in a manner in which the width direction outer side edge is inclined with respect to the upper-lower direction corresponding to the end portion 5a (see FIG. 1) of the side wall 5 of the cabin 2.

As shown in FIGS. 1 and 2, the ceiling wall portion 50 is a wall integrally formed with the floor wall portion 10, the side wall portion 20, the front wall portion 30, and the rear wall portion 40 so as to close an opening (see FIG. 3) defined by the floor wall portion 10, the side wall portion 20, the front wall portion 30, and the rear wall portion 40. That is, the ceiling wall portion 50 extends continuously with the floor wall portion 10 and the side wall portion 20. The ceiling wall portion 50 has a bent shape corresponding to the end portion 4a of the ceiling wall 4 of the cabin 2 and the end portion 5a of the side wall 5 of the cabin 2 (see FIG. 1). An engagement structure (not shown) that engages with an inner surface of the end portion 4a of the ceiling wall 4 of the cabin 2 and an inner surface of the end portion 5a of the side wall 5 of the cabin 2 is provided on an outer surface of the ceiling wall portion 50. The engagement structure is used to install the ceiling wall portion 50 (that is, the entire room 1 having a hollow box shape) above two seat units 6 (that is, six seats 7 in total) that are adjacent in the front-rear direction corresponding to the two seat units 6 and the ceiling wall portion 50 and to install the ceiling wall portion 50 so that the ceiling wall portion 50 extends in the front-rear direction, as shown in FIGS. 1 to 3. The engagement structure has sufficient engagement strength in consideration of a weight of the room 1 and weights of passengers entering the room 1. The engagement structure can appropriately adopt fastening using a bolt, bonding by welding, or the like. However, a specific arrangement, shape, or the like of the engagement structure is not particularly limited.

As shown in FIGS. 2 and 3, the opening portion 23 having a long rectangular shape in the upper-lower direction is defined in the room 1 by the protruding end edge 12 of the floor wall portion 10 extending in the front-rear direction, a front end edge of the side wall portion 20 (more specifically, the protruding portion 21) extending in the upper-lower direction, a width direction inner side edge of the front wall portion 30 extending in the upper-lower direction, and a width direction inner side edge of the ceiling wall portion 50 extending in the front-rear direction. A passenger can enter and leave the room 1 through the opening portion 23.

As shown in FIGS. 2 to 4, a luggage storage room 60 having a hollow box shape extending in the front-rear direction is fixed to an outer surface of the side wall portion 20 (that is, an outer side of the room 1) in a manner of covering a part of the outer surface. A substantially rectangular flat plate shaped lid portion 61 extending in the front-rear direction is provided on a width direction inner side wall defining the luggage storage room 60, and the lid portion 61 can be opened and closed. An upper end edge of the lid portion 61 that extends in the front-rear direction is pivotally supported on a width direction inner side wall of the luggage storage room 60. That is, a passenger can pivot and open the lid portion 61 by pulling a periphery of a lower end edge portion of the lid portion 61 to a width direction inner side and can store luggage or the like of the passenger in the luggage storage room 60. Accordingly, the room 1 also has a function of a luggage rack that is generally provided above seats.

As shown in FIG. 2, a substantially U-shaped handrail portion 70 is integrally provided outside the room 1 in a manner of surrounding a peripheral edge of the opening portion 23. The handrail portion 70 includes a front side portion 71 that is provided at a width direction inner edge of the front wall portion 30 extending in the upper-lower direction and that extends in the upper-lower direction, a rear side portion 72 that is provided at a front end edge of the side wall portion 20 (protruding portion 21) extending in the upper-lower direction and that extends in the upper-lower direction, and a coupling portion 73 that extends in the front-rear direction so as to couple lower ends of the front side portion 71 and the rear side portion 72. The coupling portion 73 is located slightly below a lower end edge of the opening portion 23 (that is, the protruding end edge 12 of the protruding portion 11).

As shown in FIGS. 1 to 3, a ladder portion 80 is coupled to the coupling portion 73 of the handrail portion 70 in a manner of extending downward from the coupling portion 73. Specifically, the ladder portion 80 includes a rectangular frame shaped ladder body portion 81 that extends in the upper-lower direction and the front-rear direction and is long in the upper-lower direction, and a plurality of substantially rectangular flat plate shaped step portions 82 that are provided at a plurality of positions of the ladder body portion 81 in the upper-lower direction and are spaced from one another in the upper-lower direction. Each step portion 82 is supported by the ladder body portion 81 and capable of pivoting in the upper-lower direction, so that the step portion 82 can be folded.

An upper side coupling portion 83 (see FIGS. 1 and 2) provided at an upper end portion of the ladder body portion 81 is coupled to the coupling portion 73 of the handrail portion 70, and a lower side coupling portion 84 (see FIG. 1) provided at a lower end portion of the ladder body portion 81 is coupled to a predetermined position 6a (see FIG. 1) at a width direction inner side (passage side) of the front side seat unit 6 of the two seat units 6 provided corresponding to the room 1, so that the ladder portion 80 is coupled to the handrail portion 70 and the seat unit 6. Accordingly, in addition to the engagement structure between the ceiling wall portion 50 and inner walls of the cabin 2 (the end portion 4a of the ceiling wall 4 and the end portion 5a of the side wall 5), the room 1 can also be supported by the seat unit 6. Therefore, the room 1 can be firmly fixed in the cabin 2.

A passenger who wants to enter or leave the room 1 can go upstairs to the opening portion 23 of the room 1 (that is, an inner space of the room 1) or can go downstairs to the bottom wall 3 of the cabin 2 by sequentially stepping on the plurality of step portions 82 of the ladder portion 80 in the upper-lower direction while holding the handrail portion 70 and the ladder body portion 81 of the ladder portion 80 by hand.

In order to improve comfort of the room 1 serving as a bedroom or a lounge for a passenger, as shown in FIG. 3, a mattress 91 (see FIG. 3) is provided on an inner surface (upper surface, surface serving as a berth) of the floor wall portion 10, and a backrest cushion 92 is provided on an inner surface of each of the side wall portion 20 (recessed portion 22) and the rear wall portion 40. Accordingly, a passenger can comfortably maintain a lying-down posture using the mattress 91, and can comfortably maintain a sitting posture using the cushion 92. In particular, when a passenger maintains a sitting posture using the cushion 92, an upper body of the passenger (in particular, a periphery of shoulders) is located in the recessed portion 22 of the side wall portion 20 (that is, a portion where an inner space of the rear end portion of the room 1 is expanded). Therefore, comfort of the room 1 is further improved.

Further, as shown in FIG. 3, an openable/closable mini table 93 for placing a cup or the like is provided on an inner surface of the side wall portion 20 (protruding portion 21). Further, a monitor (not shown) may be provided on an inner surface of the front wall portion 30, a body fixing belt (not shown) may be provided at a predetermined position on an inner surface of the room 1, or a clothes hanger (not shown) may be provided at a predetermined position of the inner surface of the room 1. Furthermore, a light or a mirror may be provided at a predetermined position of an inner space of the room 1.

Main functions and effects of the room 1 according to the present embodiment will be collectively described below.

The room 1 is formed into a box shaped inner space defined by the floor wall portion 10 facing the seats 7 (the seat unit 6) in the cabin 2, the side wall portion 20 that extends from the floor wall portion 10 in a direction (upward) away from the seats 7 (the seat unit 6) and that has the opening portion 23 for entering or leaving the room 1, and the front wall portion 30, the rear wall portion 40, and the ceiling wall portion 50 that extend to couple the floor wall portion 10 and the side wall portion 20. The ceiling wall portion 50 of the room 1 includes an engagement structure with inner walls of the cabin 2 (the end portion 4a of the ceiling wall 4 and the end portion 5a of the side wall 5). Accordingly, the room 1 can be installed above the seats 7 (seat unit 6), and it is not necessary to reduce the number of seats when installing the room 1. When the room 1 is installed above the seats 7 (seat unit 6), a passenger can enter and leave the room 1 by using the ladder portion 80 extending in a direction (downward) close to the seats 7 (the seat unit 6) from a periphery of the opening portion 23 of the side wall portion 20, and an original function of a berth on which a passenger can lie down and sleep is not impaired.

The room 1 is provided with the luggage storage room 60 at the side wall portion 20 of the room 1. Accordingly, the room 1 also has a function of a luggage rack that is generally provided above seats. For example, when a luggage rack is provided at a position separate from the room 1, the luggage storage room 60 may not be necessarily provided at the side wall portion 20. An inner space of the room 1 is expanded by a size of the luggage storage room 60 when the luggage storage room 60 is not provided, and comfort of the room 1 is further improved.

Further, since the room 1 is provided with the recessed portion 22 recessed from the inner side to the outer side of the room 1 at the side wall portion 20, an inner space of the room 1 is expanded. Accordingly, for example, a passenger can use the room 1 in a state in which an upper body of the passenger (particularly, a periphery of shoulders of a large width) is located at the recessed portion 22, and comfort of the room 1 is improved.

Since the ladder portion 80 extending in a direction (downward) from the room 1 to the seats 7 (seat unit 6) is coupled to the seat unit 6 via the lower side coupling portion 84 in the room 1, the room 1 can be supported by the seat unit 6 in addition to the engagement structure with inner walls (the end portion 4a of the ceiling wall 4 and the end portion 5a of the side wall 5) of the cabin 2. Accordingly, the room 1 can be firmly fixed in the cabin.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Features of the room 1 according to the embodiment of the present invention described above will be briefly summarized and listed in the following [1] to [4].

[1] A room for an aircraft cabin (2) which is a hollow box shaped room (1) and installed in the aircraft cabin (2), the room (1) comprising:
a floor wall portion (10) facing a seat (7) of the cabin (2);
a side wall portion (20) that extends from the floor wall portion (10) in a direction away from the seat (7) and has an opening portion (23) for entering and leaving the room (1);
a ladder portion (80) extending in a direction toward the seat (7) from a periphery of the opening portion (23); and
a ceiling wall portion (50) that extends to couple the floor wall portion (10) and the side wall portion (20) and has an engagement structure with an inner wall (4a and 5a) of the cabin (2).

[2] The room (1) for an aircraft cabin according to [1], in which the side wall portion (20) includes a luggage storage room (60) that is openable and closable from an outer side of the room (1).

[3] The room (1) for an aircraft cabin according to [1], in which the side wall portion (20) includes a recessed portion (22) that is recessed from an inner side to an outer side of the room (1) and expands an inner space of the room (1).

[4] The room (1) for an aircraft cabin according to [1], in which the ladder portion (80) includes a coupling portion (84) for coupling to the seat (7).

REFERENCE SIGNS LIST 1 room
2 cabin
4a end portion of ceiling wall (inner wall)
5a end portion of side wall (inner wall)
7 seat
10 floor wall portion
20 side wall portion
22 recessed portion
23 opening portion
50 ceiling wall portion
60 luggage storage room
80 ladder portion
84 lower side coupling portion (coupling portion)

What is claimed is:

1. A room for an aircraft cabin which is a hollow box shape and installed in the aircraft cabin, the room comprising:
a room floor wall portion that is configured to face a seat of the cabin and to be disposed above the seat;
a room side wall portion that extends from the room floor wall portion in a direction away from the seat and includes an opening portion to permit a passenger to enter and leave the room;
a ladder portion that extends in a direction toward the seat from a periphery of the opening portion; and
a room ceiling wall portion that extends to couple the room floor wall portion and the room side wall portion and includes an engagement structure with an inner wall of the cabin, wherein
the inner wall of the cabin includes a cabin ceiling wall and a cabin side wall,
the room ceiling wall portion contours a portion of the cabin ceiling wall and a portion of the cabin side wall,
a first end of the room floor wall portion in a width direction of the cabin is not directly connected to the inner wall of the cabin, and
a second end of the room floor wall portion that is opposite to the first end in the width direction of the cabin includes an upwardly curved portion, and the room floor wall portion is directly connected to the cabin side wall via the upwardly curved portion.

2. The room for an aircraft cabin according to claim 1, wherein the room side wall portion includes a luggage storage room that is openable and closable from an outer side of the room.

3. The room for an aircraft cabin according to claim 1, wherein the room side wall portion includes a recessed portion that is recessed from an inner side to an outer side of the room and expands an inner space of the room.

4. The room for an aircraft cabin according to claim 1, wherein the ladder portion includes a coupling portion to attach the ladder portion to the seat.

* * * * *